United States Patent [19]

Aasgaard

[11] Patent Number: 5,762,456
[45] Date of Patent: Jun. 9, 1998

[54] SELF TAPPING BLIND SETTING BOLT RIVET ASSEMBLY

[75] Inventor: A. L. Pepper Aasgaard, Omaha, Nebr.

[73] Assignee: Asar Group, Inc., Omaha, Nebr.

[21] Appl. No.: 678,797

[22] Filed: Jul. 12, 1996

[51] Int. Cl.⁶ .................... F16B 13/04; F16B 39/00
[52] U.S. Cl. .................. 411/29; 411/38; 411/43; 411/107
[58] Field of Search ................... 411/29, 30, 31, 411/34, 37, 38, 43, 78, 107

[56] References Cited

U.S. PATENT DOCUMENTS

| | | | |
|---|---|---|---|
| 1,121,076 | 12/1914 | Dillon | 411/78 X |
| 1,330,689 | 2/1920 | Drew | 411/38 X |
| 3,451,303 | 6/1969 | Biermann | 411/107 |
| 4,085,337 | 4/1978 | Moeller | 411/30 X |
| 4,211,145 | 7/1980 | Dolch | 411/43 |
| 4,377,361 | 3/1983 | Frieberg | 411/161 |
| 4,408,938 | 10/1983 | Maguire | 411/38 X |
| 4,436,467 | 3/1984 | Larsson et al. | 411/107 |
| 4,580,936 | 4/1986 | Francis et al. | 411/43 |
| 4,988,247 | 1/1991 | Summerlin | 411/38 |
| 5,183,357 | 2/1993 | Palm | 411/29 |
| 5,219,252 | 6/1993 | Schruff | 411/107 X |
| 5,246,323 | 9/1993 | Vernet et al. | 411/29 |
| 5,252,014 | 10/1993 | Andrews | 411/43 |
| 5,332,346 | 7/1994 | Shinjo | 411/107 |

FOREIGN PATENT DOCUMENTS

| | | | |
|---|---|---|---|
| 77858 | 5/1983 | European Pat. Off. | 411/38 |
| 705797 | 5/1966 | Italy | 411/29 |
| 25535 | of 1898 | United Kingdom | 411/29 |
| 2147385 | 5/1985 | United Kingdom | 411/43 |

*Primary Examiner*—Neill R. Wilson
*Attorney, Agent, or Firm*—Suiter & Associates PC

[57] ABSTRACT

A self-tapping, blind setting bolt rivet assembly capable of permanently fastening one or more sheet metal work pieces or the like together while also providing a hollow cylindrical threaded bolt head onto which a nut may be affixed to a means to removably attach other work pieces, components or the like. The rivet assembly comprises a rivet body having a hollow tubular sleeve and a threaded stud separated by an enlarged flattened head. The rivet body surrounds a mandrel comprising a shank which is terminated in a screw tip. This screw tip punctures, spreads, and self-taps an aperture in the work pieces through which the rivet sleeve passes. The mandrel's shank may have a weakened area of reduced diameter adjacent to the screw tip which allows detachment of shaft following application of sufficient axial force to the shank. This application of force sets the rivet by causing a tapered shoulder section of the mandrel to deform the rivet sleeve. The rivet assembly may further comprise a locking washer to prevent rotation of the rivet body when the nut is tightened on the threaded stud. A process for applying the bolt rivet assembly using an adapter is also disclosed.

18 Claims, 5 Drawing Sheets

SELF TAPPING BLIND SETTING BOLT RIVET ASSEMBLY

This application is related to, application Ser. No. 08/678,797, filed Jul. 12, 1996, now pending, and application Ser. No. 08/678,863, filed Jul. 12, 1996, now pending.

CROSS REFERENCE TO RELATED APPLICATIONS

The present application claims the benefit, under 35 U.S.C. § 119, of U.S. Provisional application Ser. No. 60/017,877 filed May 17, 1996. Said Provisional application Ser. No. 60/017,877 is herein incorporated by reference in its entirety.

TECHNICAL FIELD

The present invention relates generally to rivets used for fastening together one or more sheets of material and specifically to blind setting rivet assemblies used for that purpose.

BACKGROUND OF THE INVENTION

Blind setting rivets for fastening sheet metal work pieces or the like are well known to the art. Consequently, many variations of these rivets have been developed over the years. Some, such as the "pop rivet," require a pre-drilled hole. The added drilling step required by these rivets wastes time and causes unnecessary expense. Further, application of these rivets may at times be cumbersome. For example, in many applications, special jigs must be used to maintain exact alignment of the work pieces from the time the hole is drilled until the rivet can be applied.

Because of these and other limitations, self drilling blind setting rivets were developed. Rayburn (U.S. Pat. No. 3,750, 518), Murray et al. (U.S. Pat. No. 3,935,786), Rosenthal (U.S. Pat. No. 4,920,833), Shinjo (U.S. Pat. No. 4,998,853) and Stenberg et al. (U.S. Pat. No. 5,344,267) disclose self-drilling blind setting rivet type fasteners. These rivets all utilize specialized drill heads which may be difficult to manufacture and thus expensive. Further, they may leave a burr on the outer layer of the work piece materials. This burr may prevent proper seating of the rivet as it is applied. Improper seating may cause a weak joint. Szayer et al. (U.S. Pat. No. 4,990,042) discloses a self-drilling rivet having deburring ears to remove burrs during the drilling operation. However, the Szayer drill bit removes work piece material to create a hole for the rivet shank. This removed material may fall within an enclosed area causing a possible nuisance or hazard. Further, this material could be more efficiently used to increase application strength. A more desirable blind setting rivet would be self-tapping (using a screw tip) instead of self drilling (using a drill bit). This self-tapping rivet would leave uniform excurvations which would increase application strength. Additionally, a self-tapping rivet would be less expensive and easier to manufacture.

The prior art has also failed to teach a blind setting rivet which may permanently fasten sheet metal work pieces or the like together and also removably attach other work pieces or components. For example, the above named patents are representative of typical blind setting rivets. These rivets do not contemplate a means of removably attaching other work pieces or components. Tsay et al. (U.S. Pat. No. 5,297,909) discloses a self-drilling expansion screw having a threaded portion onto which a nut may be screwed. However, the Tsay patent describes an expansion screw not a rivet. This expansion screw is designed to be anchored in concrete or the like and is incapable of permanently fastening one or more sheet metal work pieces together.

Consequently, it is desirable to have a self-tapping, blind setting rivet capable of permanently fastening one or more sheet metal work pieces or the like together while also providing a means to removably attach other work pieces, components or the like.

OBJECTS OF THE INVENTION

Therefore, it is an object of the present invention to provide a superior blind setting rivet which is self-tapping, leaving uniform excurvations which increase application strength and allow the rivet to seat properly.

It is another object of the present invention to provide a self-tapping, blind setting rivet which may be used to join one or more sheet metal work pieces together while requiring access to only one side which also provides a means to removably attach other work pieces, components, or the like.

It is yet another object of the present invention to provide a process for applying this self-tapping, blind setting bolt rivet assembly utilizing a simple adaptor which is inexpensive and easy to manufacture.

It is a further object of the present invention to provide a self-tapping, blind setting bolt rivet which is inexpensive and easy to manufacture.

SUMMARY OF THE INVENTION

The present invention provides a self-tapping, blind setting bolt rivet assembly comprising a hollow rivet body surrounding a mandrel. The rivet body may comprise upper and lower ends separated by an enlarged flattened head adapted to abut the surface of a work piece. Preferably, the lower end of the rivet body is a hollow tubular sleeve while the upper end comprises a hollow cylindrical threaded bolt head onto which a nut may be removably affixed to secure one or more work pieces or components. The mandrel may comprise a self-tapping screw tip having a diameter at least equal to the outside diameter of the lower end of the sleeve. The screw tip forms an aperture or hole through which the sleeve may be passed by separating and folding the material of one or more work pieces. A shoulder section adjacent to the screw tip may have an outer diameter greater than the inner diameter of the sleeve. This feature allows the shoulder section to radially compress and spread the lower end of the sleeve as the mandrel is retracted rearward relative to the rivet body during application. The mandrel may also comprise a shank which may have an area of reduced diameter spaced rearward from the shoulder section. This area may be sized to allow the screw tip and shoulder of the mandrel to be detached from the shank upon application of predetermined tensile force to the shank.

After application of the rivet, the screw tip may either be retained permanently within the rivet sleeve or allowed to drop off. In an embodiment wherein the screw tip is retained, the shoulder section of the mandrel preferably has a tapered upper face. Additionally, the shank may have an area of enlarged diameter spaced between the shoulder section and the area of reduced diameter. The shoulder section and area of enlarged diameter act together to retain the screw tip and shoulder section within the sleeve by creating an interference with the inner diameter of the lower end of the sleeve. This interference is created by deformation of the sleeve during application of the rivet.

In an embodiment wherein the screw tip is allowed to drop off, the shoulder section of the mandrel may have an upper face consisting of a tapered inner section and a flat-plate outer section. In this embodiment, the tapered inner section initially spreads the lower end of the sleeve. The flat-plate outer section then flattens the lower end of the sleeve against the work piece allowing the screw tip and shoulder section to drop off following application.

The rivet assembly may further comprise a locking washer to prevent rotation of the rivet body when the nut is tightened on the threaded bolt head. This washer may encircle the rivet body sleeve and be trapped between the enlarged flattened head and the upper surface of a work piece.

A process for applying the self-tapping, blind setting bolt rivet assembly described above is also disclosed. According to this process, the threaded bolt head and mandrel shank of the rivet assembly may be inserted into an adapter. This adapter may consist of a blank having generally cylindrical forward and rear sections. The forward section may have a forward face shaped to abut the rivet head of the bolt rivet assembly. The rear section may have a threaded outer circumference to allow attachment of a hand or power tool. Preferably, the blank has a cylindrical aperture shaped to removably accept the threaded bolt head and mandrel shank of the bolt rivet assembly. This aperture may extend longitudinally through the center of the blank and consists of a forward cavity having a diameter and length slightly greater than the diameter and length of the threaded bolt head, and a rear cavity having a diameter slightly greater than the outer diameter of the mandrel shank. The screw tip of the bolt rivet assembly may then be placed in contact with a work piece and rotary motion applied to the mandrel shank to tap and thread the screw tip into the work piece materials. This rotary motion causes the screw tip to create an aperture in the work piece which preferably has an inner diameter slightly larger than the outer diameter of the sleeve of the bolt rivet assembly. The sleeve of the bolt rivet assembly may then be inserted through the aperture in the work piece so that the rivet head is flush to the outer surface of the work piece. Finally, the mandrel shank may be axially retracted while the user holds the adapter firmly against the rivet head and work piece until the shank separates.

BRIEF DESCRIPTION OF THE DRAWINGS

The numerous objects and advantages of the present invention may be better understood by those skilled in the art by reference to the accompanying figures of which.

DETAILED DESCRIPTION OF AN EXEMPLARY EMBODIMENT

Figure 1:
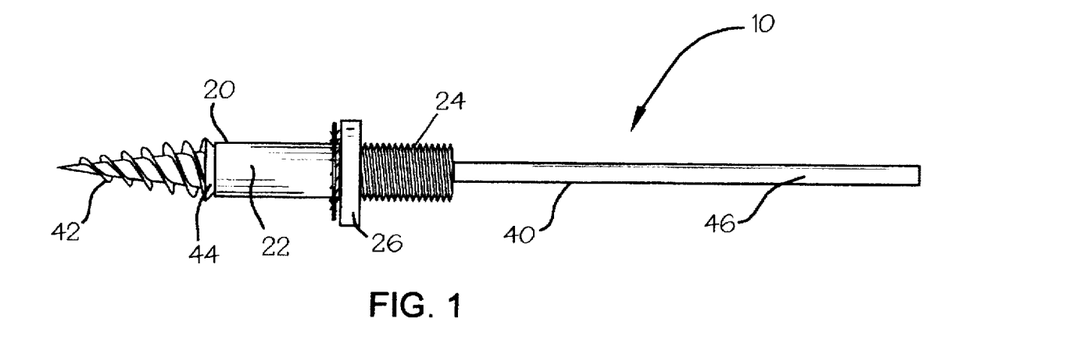
FIG. 1 is a side elevational view of a self-tapping blind setting bolt rivet assembly according to a preferred embodiment of the present invention.

FIG. 1 discloses a self-tapping, blind setting bolt rivet assembly according to an exemplary embodiment of the present invention. The rivet assembly 10 preferably comprises a hollow rivet body 20 surrounding a mandrel 40. Preferably, the rivet body 20 comprises a hollow tubular sleeve 22 and a threaded bolt head 24 separated by an enlarged flattened head or flange 26. The rivet body 20 may be made of steel, aluminum, plastic, composite, or other desirable rivet material. The mandrel 40 may comprise a self-tapping screw tip 42, shoulder section 44, and shank 46.

The mandrel 40 may be made of steel, aluminum, plastic composite, or other material which is preferably of higher tensile strength than the rivet body material.

Figure 2:
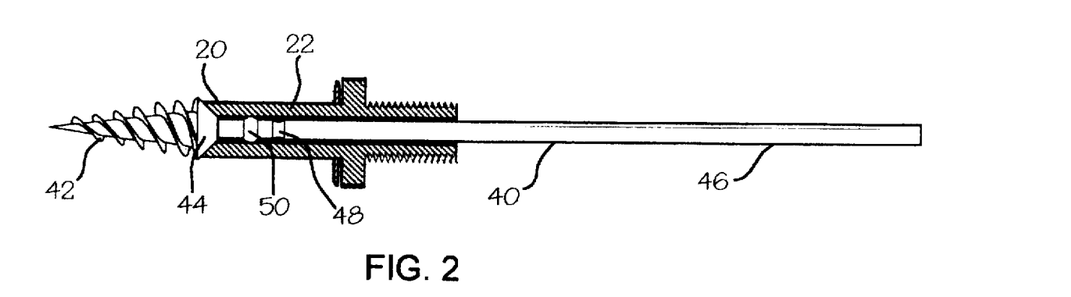
FIG. 2 is a partial cross-sectional side elevational view of the rivet assembly shown in FIG. 1 illustrating the rivet body and mandrel.

FIG. 2 provides a cross-sectional view of the rivet body 20 and discloses additional features of the mandrel 40. A weakened area of reduced diameter 48 may be formed on the mandrel shank 46 rearward from the shoulder section 44. This weakened area 48 is preferably sized to allow the screw tip 42 and shoulder section 44 to be detached from the shank 46 upon application of predetermined tensile force to the shank. Likewise, an area of enlarged diameter 50 may be formed on the shank 46 between the shoulder section 44 and the weakened area of reduced diameter 48. Preferably, this enlarged area 50 retains the screw tip 42 and shoulder section 44 within the sleeve 22 after application of the rivet by creating an interference with the inner surface of the sleeve. This interference may be created as the sleeve 22 is deformed during application of the rivet.

Figure 3:
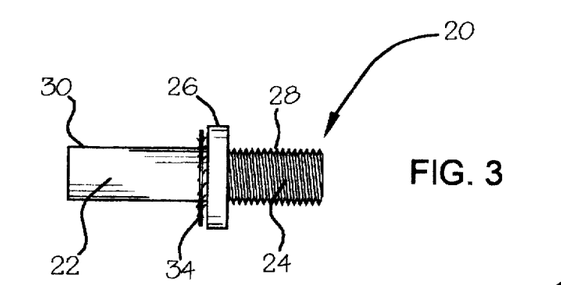
FIG. 3 is a side elevational view depicting the rivet body of the bolt rivet assembly shown in FIG. 1.

FIG. 3 is a side elevational view depicting the rivet body of the bolt rivet assembly shown in FIG. 1. The rivet body 20 may comprise upper and lower ends (28 & 30) separated by an enlarged flattened head 26 adapted to abut the surface of a work piece (not shown). Preferably, the lower end 30 of the rivet body 20 comprises a hollow tubular sleeve 22 while the upper end 28 comprises a hollow cylindrical threaded bolt head 24 onto which a nut may be removably affixed to secure one or more work pieces or components (not shown). The rivet assembly may further comprise a locking washer 34 to prevent rotation of the rivet body 20 within the work pieces when a nut is tightened on the threaded bolt head 24 (see FIG. 7). This washer 34 may encircle the rivet body sleeve 22 and be trapped between the enlarged flattened head or flange 26 and the upper surface of a work piece (not shown).

Figure 4:
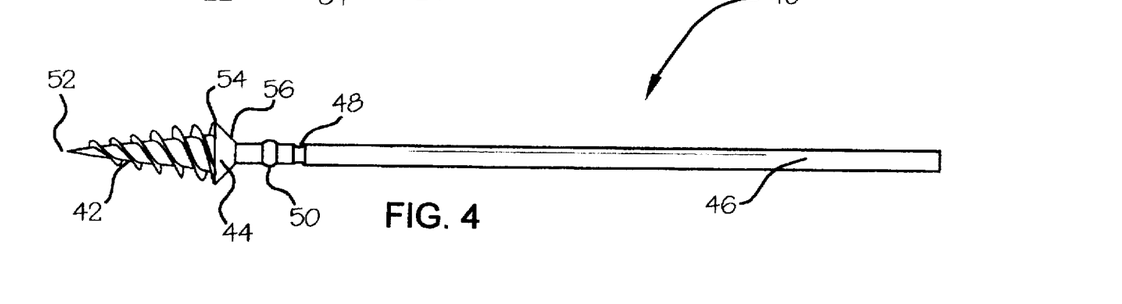
FIG. 4 is a side elevational view depicting the mandrel of the bolt rivet assembly shown in FIG. 1.

FIG. 4 is a side elevational view depicting the mandrel of the bolt rivet assembly shown in FIG. 1. The mandrel 40, which is disposed longitudinally within the rivet body (not shown), may comprise a screw tip 42, a shoulder section 44 and a shank 46. The screw tip 42 may form a hole or aperture in a work piece (not shown) by puncturing and separating the work piece materials. Preferably, the screw tip 42 is essentially a standard sheet metal screw except that it may have a more pointed tip 52 to facilitate piercing of the outer work piece surface. The shoulder section 44 located adjacent to the screw tip 42 may comprise a tapered upper face 56 having an outer diameter 54 greater than the inner diameter of the rivet body sleeve (see FIG. 2). During application of the rivet, the shoulder section 42 may radially compress and spread the lower end of the sleeve as the mandrel 40 is retracted rearward relative to the rivet body. The mandrel shank 46 may have a weakened area of reduced diameter 48 spaced rearward from the shoulder section 44. This weakened area 48 may be sized to allow the shoulder section 44 of the mandrel 40 to be detached from the shank 46 upon application of predetermined tensile force to the shank. Likewise, an area of enlarged diameter 50 may be formed on the shank 46 between the shoulder section 44 and the weakened area of reduced diameter 48. Preferably, this enlarged area 50 retains the screw tip 42 and shoulder section 44 within the sleeve (not shown), after application of the rivet, by creating an interference with the inner surface of the sleeve. This interference may be created as the sleeve is deformed during application of the rivet. The rear portion of the shank 46 may be designed for use with a specialized chuck (not shown) or various types of power or hand tools (not shown) to provide rotary motion and axial retraction to the mandrel 40.

Figure 5:
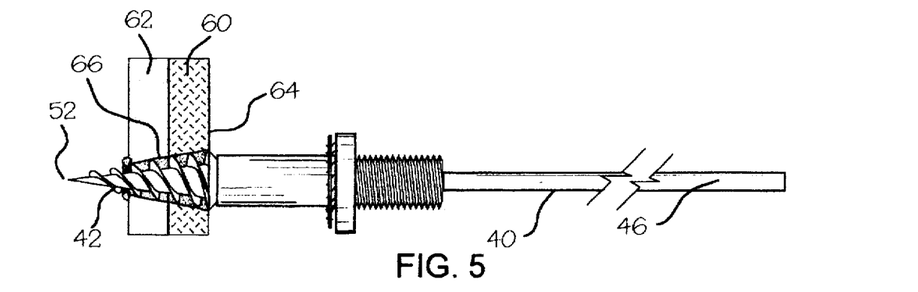
FIG. 5 is a side elevational view of the rivet assembly shown in FIG. 1 depicting the rivet assembly at initial application.
Figure 6:
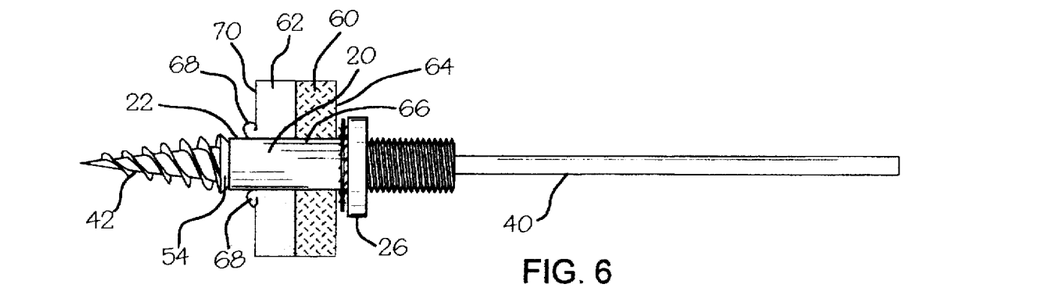
FIG. 6 is a side elevational view of the rivet assembly shown in FIG. 1 depicting the rivet assembly following the separation and folding of an aperture through the work piece materials by the screw tip.
Figure 7:
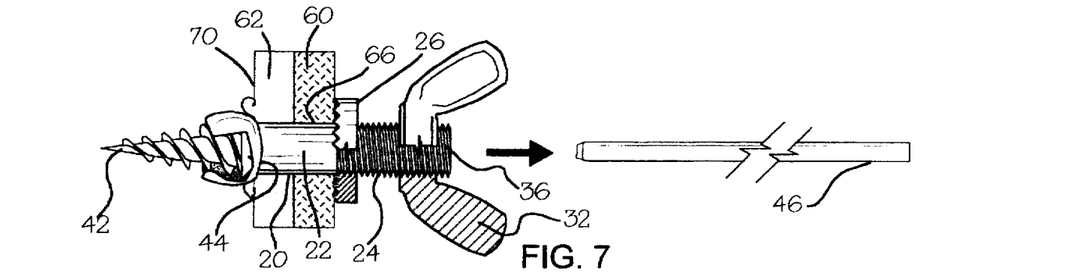
FIG. 7 is a partial cross-sectional side elevational view of the bolt rivet assembly shown in FIG. 1 depicting the rivet assembly following the application of an axial force on the rivet sleeve, detachment of mandrel shank and addition of a wing nut to the threaded bolt head.

FIGS. 5 through 7 illustrate the application of the self-tapping, blind setting bolt rivet assembly, described in connection with FIG. 1, to fasten together one or more sheet metal work pieces or the like. FIG. 5 is a side elevational view depicting the screw tip 42 of the rivet assembly 10 piercing two adjacent work pieces (60 & 62) at initial application. The self-tapping screw tip 42 may be held normal to the outer work piece surface 64 while rotary motion is applied to the mandrel shank 46 to pull the screw tip into the work piece materials (60 & 62). The screw tip 42 may form a hole or aperture 66 in the work pieces (60 & 62) by puncturing and separating the work piece materials. Preferably, the screw tip 42 is essentially a standard sheet metal screw except that it may have a more pointed tip 52 to facilitate piercing of the outer work piece surface 64. The rear portion of the shank 46 may be designed for use with a specialized chuck (not shown) or various types of power or hand tools (not shown) to provide rotary motion and axial retraction to the mandrel 40.

FIG. 6 is a side elevational view of the rivet assembly illustrated in FIG. 1 following the separation and folding of an aperture through the work piece materials by the screw tip. By using a power or hand tool (not shown), rotary motion may be applied to the mandrel 40 causing the self-tapping screw tip 42 to tap a hole or aperture 66 in adjacent work pieces (60 & 62). As the self-tapping screw tip 42 punctures and spreads the work piece materials, material 68 on the inner surface 70 of the innermost work piece 62 may be separated and folded longitudinally. This folding increases the strength of the attachment compared to a drilled hole. Preferably, the outer diameter of the shoulder section 54 of the mandrel 40 is slightly larger than outer diameter of rivet sleeve 22 allowing the sleeve to pass through the hole or aperture 66 formed. The enlarged flattened head 26 of the rivet body 20 may abut on the outer surface 64 of the outer work piece 60 and may be retained there during application of the rivet by an adaptor or the like (see FIG. 15).

FIG. 7 is a partial cross-sectional side elevational view of the rivet assembly shown in FIG. 1 depicting the rivet assembly following the application of a rearward tension force on the mandrel shank. The rear portion of the shank 46 may be grasped by a riveting tool or the like (not shown), and axially retracted. This axial retraction of the mandrel shank 46 causes the mandrel's shoulder section 44 to deform the rivet sleeve 22. As the shoulder section 44 and screw tip 42 are drawn into the rivet sleeve 22, the tapered upper face (not shown) of the shoulder section spreads the sleeve radially. In this fashion, the rivet sleeve 22 may be spread until it will no longer pass through the aperture 66 in the work pieces (60 & 62), and is pulled securely against the inner surface 70 of the innermost work piece 62. The weakened area of reduced diameter (not shown) on the mandrel shank 46 may be sized to break at a predetermined tensile load. This load is preferably greater than the tensile load required to cause deformation of the rivet sleeve 22. FIG. 7 illustrates this deformation, which when coupled with the folding of the work piece material, forms a very strong attachment.

In the embodiment shown in FIG. 7, the screw tip 42 and shoulder section 44 may be retained in the rivet sleeve 22 of the rivet body 20 due to an interference between the enlarged area of the shank 46 and rivet sleeve. This interference may be created by deformation of the rivet sleeve 22 during application. Likewise, the tapered upper face of the shoulder section 44 may deform the rivet sleeve 22 so as to encircle the screw tip 42 to provide additional retention of the screw tip after application of the rivet.

The head of the rivet body may be part of a single piece rivet unit or it may be removable. In FIG. 7, a rivet body 20 is depicted formed from a single tube having a threaded bolt head 24 the same diameter as the sleeve portion 22. The enlarged flattened head 26 may be a separate component and may have a threaded aperture so that it may be threaded onto the bolt head 24. This enlarged flattened head 26 may be cylindrical or alternatively may have a six-sided or hex design similar to a standard nut. Additionally, the rivet body's head 26 may have its inner and outer faces serrated. These serrations may function to increase surface friction between the rivet head and the outer surface of a work piece to prevent rotation of rivet thus eliminating the need for a lock washer (not shown). Serrations may be formed to prevent rotation of the bolt rivet during loosening and/or tightening of a nut 32.

Figures 8, 9:
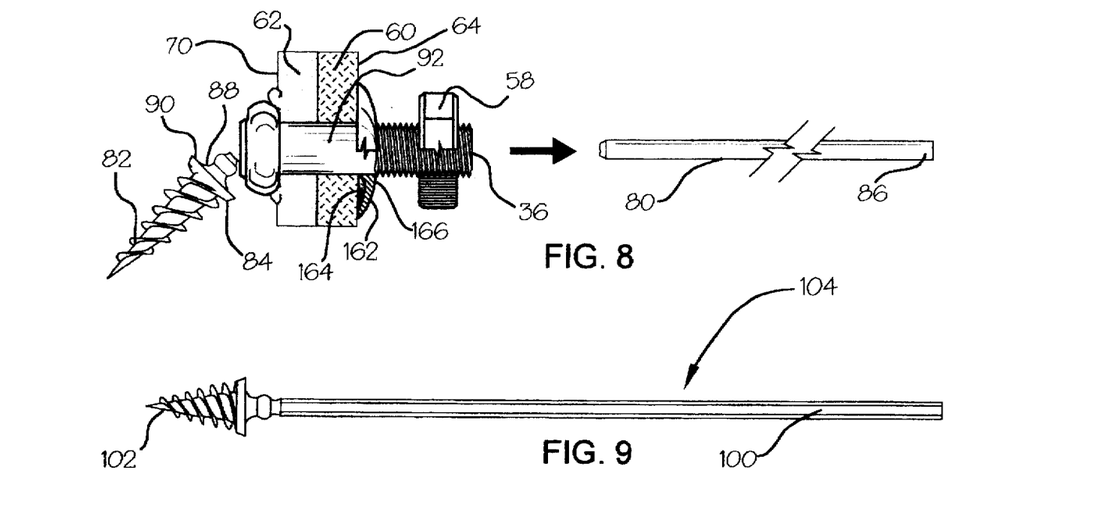
FIG. 8 is a partial cross-sectional side elevational view of an alternative embodiment of the present invention depicting the detachment of the screw tip and shoulder section following application and addition of a nut to the threaded bolt head.
FIG. 9 is a side elevational view of an alternative embodiment of the mandrel having a modified six-sided shank.

FIG. 8 is a partial cross-sectional side elevational view of an alternative embodiment of the present invention depicting the detachment of the screw tip 82 and shoulder section 84 following application of the rivet. In this embodiment, wherein the screw tip 82 is allowed to drop off, the shoulder section 84 of the mandrel 80 may have an upper face consisting of a tapered inner section 88 and a flat-plate outer section 90. Preferably, the tapered inner section 88 initially spreads the lower end of the rivet sleeve 92. The flat-plate outer section 90 then flattens the sleeve 92 against the inner surface 70 of the innermost work piece 62 allowing the screw tip 82 and shoulder section 84 to drop off following application of the rivet.

FIG. 8 further depicts a rivet body comprising a head 162 having a concave inner face 164 and convex outer face 166. This head 162 may be of various diameters depending upon the application's requirements. Preferably, as the rivet assembly is applied, axial retraction of the mandrel 80 pulls the enlarged flattened head 162 against the outer surface 64 of the outer work piece 60, compressing and flattening its concave inner face 164. When the weakened area (not shown) on the mandrel 80 fractures and the shank 86 is released, the concave inner face 164 attempts to retain its original shape causing the rim 168 of the inner face to apply a spring-like force to the outer surface 64 of the outer workpiece 60. This force holds the work pieces (60 & 62) snugly between the head 162 and deformed portion of the rivet body's sleeve 92. As a result, the head 162 may increase application strength and prevent rotation of the rivet body with or without a locking washer or serrated inner surface (not shown).

In FIGS. 7 and 8, a wing nut 32 and a standard nut 58, respectively, are shown placed on the threaded bolt head 24. Additional work pieces, other components, or the like (not shown) may be removably attached to the threaded bolt head 24 and secured by the nut. The threaded bolt head 24 may have threads 36 of various pitches depending on the needs of the user.

FIG. 9 is a side elevational view of an alternative embodiment of the mandrel 104 having a modified six-sided shank 100 and a modified screw tip 102. This six-sided shank 100 may be desirable for heavy duty applications. The shank illustrated in FIG. 9 is formed without an enlarged area so as to allow the screw tip 102 to drop off after application. Further, the screw tip 102 is modified, having a lower thread pitch than the screw tip shown in FIG. 1. Screw tips having different points and thread pitches may be used depending on the materials being joined.

Figure 10:
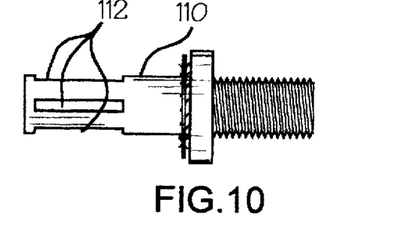
FIG. 10 is a side elevational view of the rivet body of an alternative embodiment the of the rivet assembly wherein the rivet body sleeve further comprises a plurality of longitudinal openings.
Figure 11:
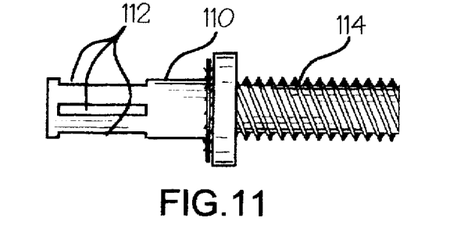
FIG. 11 is a side elevational view a further embodiment the of the rivet body shown in FIG. 10 having a modified threaded bolt head.

FIGS. 10 and 11 are side elevational views of alternative embodiments of the rivet assembly wherein the rivet body sleeve 110 further comprises a plurality of longitudinal openings 112. FIG. 11 also illustrates a rivet body wherein the threaded bolt head 114 has a modified thread design. In certain applications, it may be desirable for the threaded portion of the rivet body to have multiple sets of threads. A separate head may be fashioned so that its internal threads may be stripped by these multiple threads as it is being threaded onto the rivet body. Thus, once threaded onto the threaded portion, the head cannot be removed. In this fashion, the head may be tightened onto the rivet body and permanently retained. A second nut may be fashioned having a thread pattern corresponding to that of the rivet body so that it will not be stripped and consequently may be removable.

Figure 12:
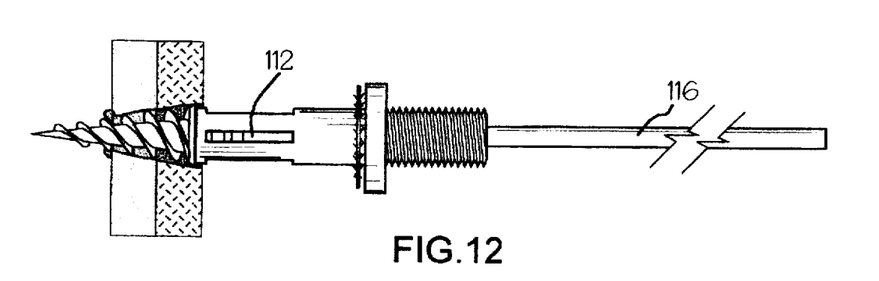
FIG. 12 is a side elevational view of a bolt rivet assembly, having a rivet body according to the embodiment shown in FIG. 10, depicting the threaded screw of the rivet assembly piercing a work piece at initial application.
Figure 13:
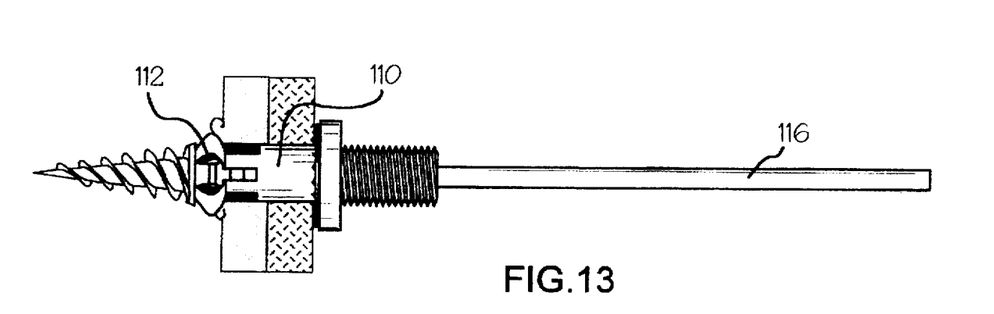
FIG. 13 is a side elevational view of the rivet assembly shown in FIG. 12 depicting the rivet assembly following the separation and folding of an aperture through the work piece materials by the screw tip.
Figure 14:
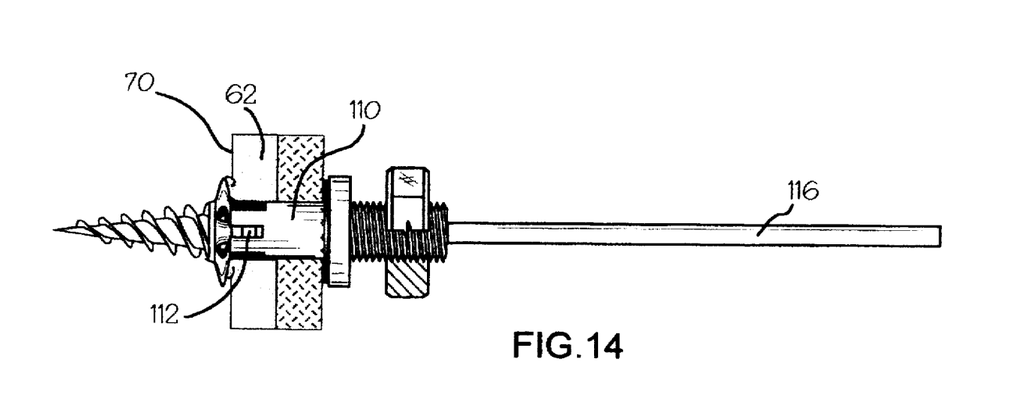
FIG. 14 is a partial cross-sectional side elevational view of the bolt rivet assembly shown in FIG. 12 depicting the rivet assembly following the application of an axial force on the rivet sleeve and detachment of mandrel shank.

As shown in FIGS. 12 through 14, the longitudinal openings 112 disclosed in FIGS. 10 and 11 may assist sleeve deformation by decreasing the area of the rivet sleeve 110 that must be deformed, thus reducing the required axial retraction force to complete application. This sleeve design is preferred for heavy duty applications, but may be used for light duty applications as well.

FIG. 12 is a side elevational view of the rivet assembly shown in FIG. 10 depicting the screw tip of the rivet assembly piercing a work piece at the beginning of application.

FIG. 13 is a side elevational view of the rivet assembly shown in FIG. 10 depicting the rivet assembly following the separation and folding of an aperture through the work piece materials by the screw tip. The area of the rivet sleeve 110 having the longitudinal openings 112 is shown partially deformed by the application of an axial force to the mandrel shank 116.

FIG. 14 is a partial cross-sectional side elevational view of the bolt rivet assembly shown in FIG. 10 depicting the rivet assembly following the application of an axial force on the rivet sleeve and detachment of mandrel shank. The area of the rivet sleeve 110 having the longitudinal openings 112 is shown fully deformed, being completely flattened and spread against the inner surface 70 of the innermost work piece 62. At a predetermined tensile force which is greater than the force required to completely deform the rivet sleeve 112, the weakened area of the mandrel shank 116 breaks releasing the shank for the rivet assembly. The shank 116 may then be discarded.

Figure 15:
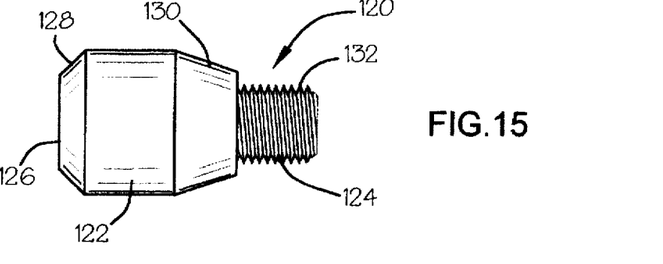
FIG. 15 is a side elevational view disclosing a preferred embodiment of an adaptor which may be used to apply the self-tapping, blind setting bolt rivet assembly to join one or more work pieces.

FIG. 15 is a side elevational view disclosing a preferred embodiment of an adaptor which may be used to apply the self-tapping, blind setting bolt rivet assembly to join one or more work pieces. This adapter 120 may consist of a blank having generally cylindrical forward and rear sections (122 & 124). The forward section 122 may have a forward face 126 shaped to abut the rivet head of the bolt rivet assembly (not shown). This forward section 122 may also have tapered front and back outer surfaces (128 & 130) to provide a more comfortable grip for the user. The rear section 124 may have a threaded outer circumference 132 to allow attachment of a hand or power tool (not shown).

Figure 16:
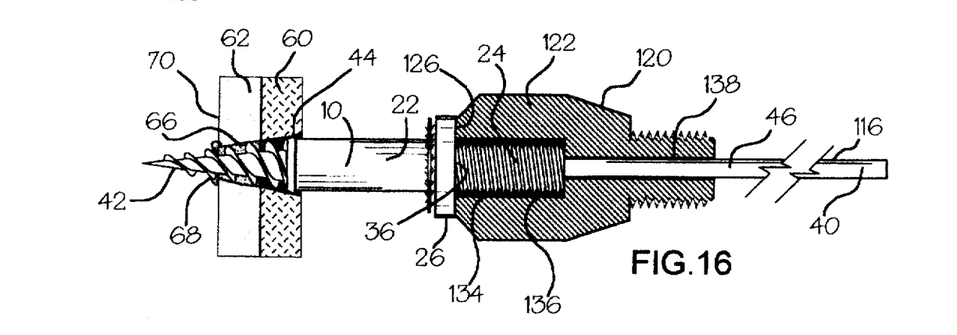
FIG. 16 is a partial cross-sectional side elevational view depicting a bolt rivet assembly inserted in the adapter shown in FIG. 15 prior to application of the rivet.
Figure 17:
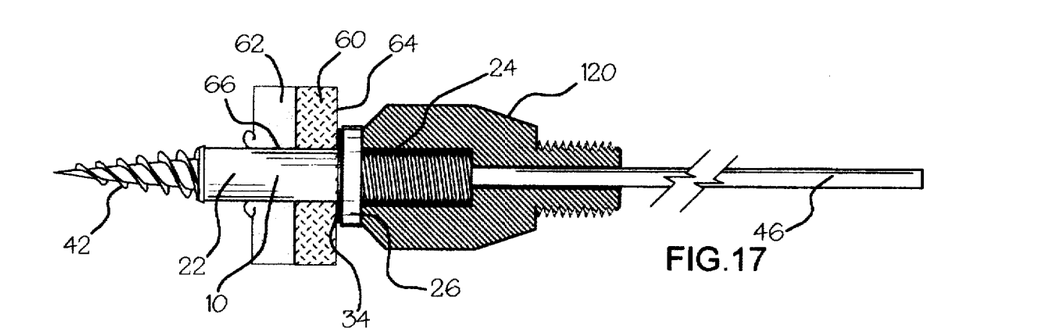
FIG. 17 is a partial cross-sectional side elevational view depicting a bolt rivet assembly inserted in the adapter shown in FIG. 15 prior to retraction of the mandrel.
Figure 18:
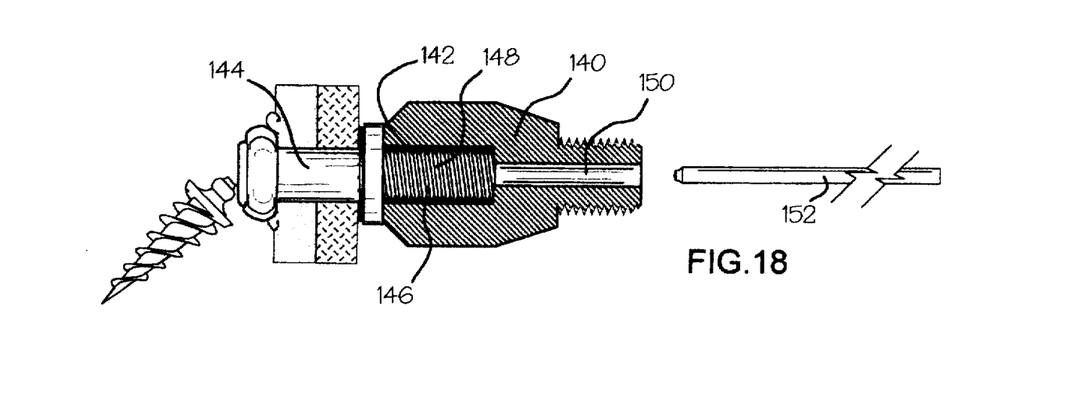
FIG. 18 is a partial cross-sectional elevational view of a bolt rivet assembly inserted in an alternative embodiment of the adaptor depicted after separation of the mandrel shank and detachment of the screw tip.

FIGS. 16 through 18 illustrate the process for applying the bolt rivet assembly shown in FIG. 15 to join two work pieces. FIG. 16 is a partial cross-sectional side elevational view depicting a bolt rivet assembly inserted in the adapter shown in FIG. 15 prior to application of the rivet. Preferably, the adapter 120 has a cylindrical aperture 134 shaped to removably accept the threaded bolt head 24 and mandrel shank 46 of the bolt rivet assembly 10. This aperture 134 may extend longitudinally through the center of the adapter 120 and may consist of a forward cavity 136 having a diameter and length slightly greater than the diameter and length of the threaded bolt head 24 and a rear cavity 138 having a diameter slightly greater than the outer diameter of the mandrel shank 46. The threaded bolt head 24 and mandrel shank 46 of the bolt rivet assembly 10 may be inserted into the adapter 120 so that the forward face 126 of the forward section 122 of the adapter abuts the outer face 36 of the rivet head 26. By using a power or hand tool (not shown), rotary motion may be applied to the mandrel 40 causing the self-tapping screw tip 42 to tap a hole or aperture 66 in adjacent work pieces (60 & 62). As the self-tapping screw tip 42 punctures and spreads the work piece materials, material 68 on the inner surface 70 of the innermost work piece 62 is separated and folded longitudinally. This folding increases the strength of the attachment compared to a drilled hole. Preferably, the outer diameter of the shoulder section 44 of the mandrel 40 is slightly larger than outer diameter of rivet sleeve 22 allowing the sleeve to pass through the hole or aperture formed.

FIG. 17 is a partial cross-sectional elevational view depicting a bolt rivet assembly inserted in the adapter shown in FIG. 15 prior to retraction of the mandrel. The sleeve 22 of the rivet assembly 10 may be inserted into the aperture 66 created in the work pieces (60 & 62) by the screw tip 42 such that the rivet assembly and adapter 120 are positioned perpendicular to the outer surface 64 of the outermost work piece 60. Preferably, the rivet head 26 traps the locking washer 34 against the outer surface 64 of the outermost work piece 60. The rear portion of the mandrel shank 46 may be grasped by a hand or power tool (not shown) and axially retracted. Retraction of the shank 46 sets the rivet by deforming the tubular sleeve 22 of the rivet body 20. Preferably, the adapter 120 prevents the rivet body's threaded bolt head 24 from being deformed or damaged during this part of the application process. The adapter 120 may also assist the user in holding the rivet head 26 flush to the outer surface 64 of the outermost work piece 60.

FIG. 18 is a partial cross-sectional elevational view of a bolt rivet assembly having a shortened threaded bolt head inserted in an adaptor. FIG. 18 depicts the rivet assembly and adapter after separation of the mandrel shank. This adapter 140 may have an aperture 142 shaped to fit a bolt rivet assembly 144 having a shortened threaded bolt head 146. Preferably, the depths and diameters of the forward and rear cavities (148 & 150) of the aperture 142 may be sized to correspond the configuration of any bolt rivet assembly used. FIG. 18 depicts an adapter and rivet assembly after separation of the mandrel shank 152.

Figure 19:
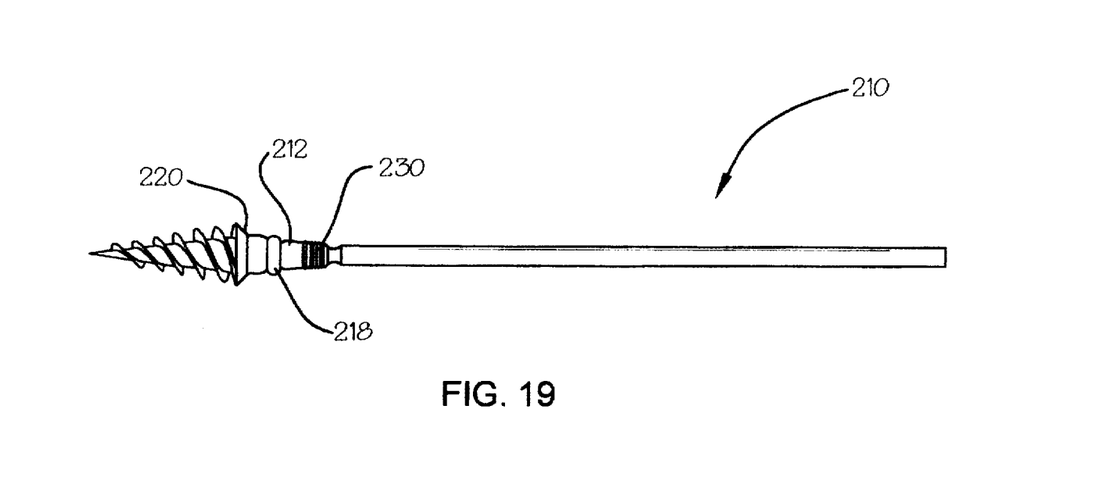
FIG. 19 is a side elevational view depicting an embodiment of the mandrel modified to enable the rivet assembly to be liquid and gas impervious.
Figure 20:
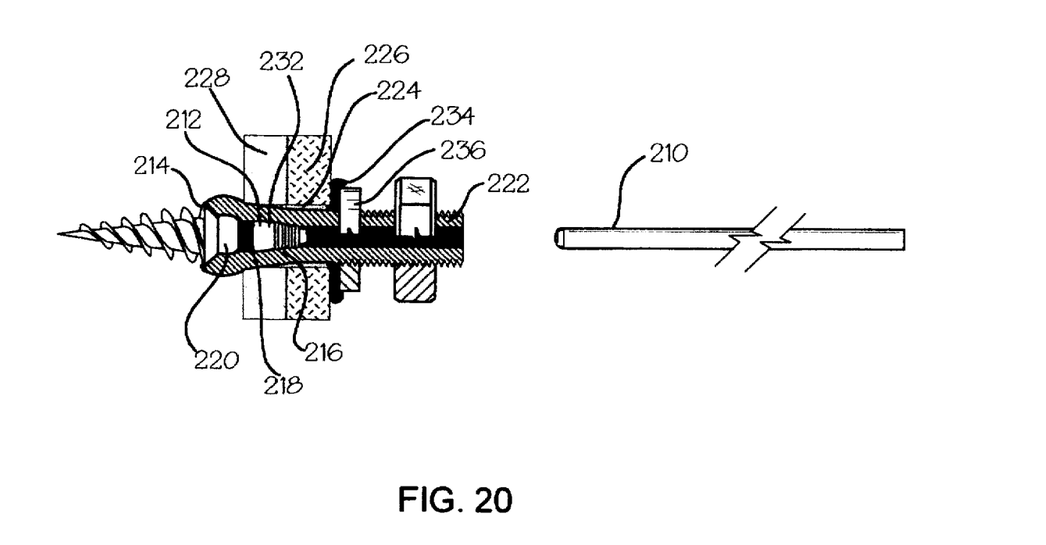
FIG. 20 is a partial cross-sectional side elevational view depicting a bolt rivet assembly employing the mandrel shown in FIG. 19.

FIGS. 19 and 20 depict an embodiment of a mandrel 210 modified to enable the rivet assembly to be environmentally sealed so as to be impervious to liquids and gases. An enlarged shank portion 212 may have an elongated conical shape to seal the aperture 214 of the tubular sleeve 216. A grommet or gasket 218 made of rubber, vinyl, plastic or the like may be added between the shoulder section 220 and this portion 212 to ensure a proper seal. Additionally, as the enlarged shank portion 212 is pulled into the sleeve 216 of the rivet body 222, its conical shape may radially expand the rivet body sleeve against the aperture 224 in the work pieces (226 & 228) forming a liquid and gas tight seal. The enlarged shank portion 212 may also have a plurality of ridges 230 to secure the forward shank 232 in the sleeve 216 preventing it from backing out. Additionally, a washer or gasket 234 made of rubber, vinyl, plastic, or the like may be disposed between the outer work piece 226 and the head 236 of the rivet body 222 to provide additional sealing capability. While these sealing features are illustrated in combination with a bolt rivet assembly according to the present invention, it should be obvious to one skilled in the art that they may be applied to other blind setting rivet assemblies as well.

In view of the above detailed descriptions of a preferred embodiment and modifications thereof, various other modifications will now become apparent to those skilled in the art. The claims below encompass the disclosed embodiments and all reasonable modifications and variations without departing from the spirit and scope of the invention.

What is claimed is:

1. A self-tapping, blind setting bolt rivet assembly comprising:
   (a) a hollow rivet body having upper and lower ends separated by an enlarged flattened head adapted to abut the surface of a work piece, said lower end comprising a hollow tubular sleeve, and said upper end comprising a hollow threaded bolt head onto which a nut may be removably affixed to secure one or more work pieces or components; and
   (b) a mandrel disposed longitudinally within said rivet body comprising
      a screw tip having a diameter at least equal to the outer diameter of said sleeve so that said sleeve may pass through an aperture formed by said self-tapping screw tip separating and folding one or more work pieces,
      a shoulder section adjacent to the screw tip having an outer diameter greater than the inner diameter of said sleeve so that the shoulder section radially compresses and spreads the lower end of said sleeve as said mandrel is retracted rearward relative to said rivet body, said shoulder section having a tapered upper face, and an area of enlarged diameter spaced between the shoulder section and the area of reduced diameter of the shank so that said shoulder section and said area of enlarged diameter act together to retain the screw tip and shoulder section within the sleeve due to interference with the inner diameter of the said sleeve caused by deformation of the sleeve during application, and
      a shank having an area of reduced diameter spaced rearward from the shoulder section and sized to allow the screw tip and shoulder section of said mandrel to be detached from the shank upon application of predetermined tensile force applied to the shank.

2. The rivet assembly according to claim 1, wherein the shank of said mandrel has a six-sided cross-sectional area.

3. The rivet assembly according to claim 1, wherein said mandrel further comprises an elongated conical portion disposed between said shoulder section and said area of reduced diameter; and a grommet encircling said mandrel between said shoulder section and said conical portion; said conical portion and grommet providing a liquid and gas impermeable seal between said sleeve and said mandrel.

4. The rivet assembly according to claim 3, wherein said elongated conical portion comprises a ridge to retain said shoulder section, grommet, and conical portion within said sleeve.

5. The rivet assembly according to claim 1, wherein the enlarged flattened head is threaded onto said threaded bolt head.

6. The rivet assembly according to claim 1, wherein the enlarged flattened head comprises a concave inner face.

7. The rivet assembly according to claim 1, further comprising a locking washer to prevent rotation of the rivet body, said washer encircling the sleeve between the enlarged flattened head and the upper surface of a work piece.

8. The rivet assembly according to claim 1, wherein said enlarged flattened head further comprises a serrated inner surface to at least partially prevent rotation of said rivet body in said one or more work pieces.

9. The rivet assembly according to claim 1, wherein said enlarged flattened head further comprises a serrated outer surface.

10. The rivet assembly according to claim 1, wherein said sleeve comprises a plurality of longitudinal apertures disposed therein so as to reduce the axial force required to deform said sleeve.

11. A self-tapping, blind setting bolt rivet assembly comprising:

(a) a hollow rivet body having upper and lower ends separated by an enlarged flattened head adapted to abut the surface of a work piece, said lower end comprising a hollow tubular sleeve, and said upper end comprising a hollow threaded bolt head onto which a nut may be removably affixed to secure one or more work pieces or components; and (b) a mandrel disposed longitudinally within said rivet body comprising a screw tip having a diameter at least equal to the outer diameter of said sleeve so that said sleeve may pass through an aperture formed by said self-tapping screw tip separating and folding one or more work pieces, a shoulder section adjacent to the screw tip having an outer diameter greater than the inner diameter of said sleeve so that the shoulder section radially compresses and spreads the lower end of said sleeve as said mandrel is retracted rearward relative to said rivet body, said shoulder section including an upper face having of a tapered inner section and a flat-plate outer section wherein said tapered inner section initially spreads the lower end of said sleeve and the flat-plate outer section flattens said lower end of said sleeve against the work piece allowing said screw tip and shoulder to drop off following application, and a shank having an area of reduced diameter spaced rearward from the shoulder section and sized to allow the screw tip and shoulder section of said mandrel to be detached from the shank upon application of predetermined tensile force applied to the shank.

12. The rivet assembly according to claim 11, wherein the shank of said mandrel has a six-sided cross-sectional area.

13. The rivet assembly according to claim 11, wherein the enlarged flattened head is threaded onto said threaded bolt head.

14. The rivet assembly according to claim 11, wherein the enlarged flattened head comprises a concave inner face.

15. The rivet assembly according to claim 11, further comprising a locking washer to prevent rotation of the rivet body, said washer encircling the sleeve between the enlarged flattened head and the upper surface of a work piece.

16. The rivet assembly according to claim 11, wherein said enlarged flattened head further comprises a serrated inner surface to at least partially prevent rotation of said rivet body in said one or more work pieces.

17. The rivet assembly according to claim 11, wherein said enlarged flattened head further comprises a serrated outer surface.

18. The rivet assembly according to claim 11, wherein said sleeve comprises a plurality of longitudinal apertures disposed therein so as to reduce the axial force required to deform said sleeve.

* * * * *